US010442632B2

(12) United States Patent
Huang et al.

(10) Patent No.: US 10,442,632 B2
(45) Date of Patent: Oct. 15, 2019

(54) CONVEYER DEVICE WITH STEPLESS ADJUSTMENT

(71) Applicant: USUN TECHNOLOGY CO., LTD., Taoyuan (TW)

(72) Inventors: Chiu-Fong Huang, Taoyuan (TW); Chih-Hung Hung, Taoyuan (TW)

(73) Assignee: USUN TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 16/156,566

(22) Filed: Oct. 10, 2018

(65) Prior Publication Data

US 2019/0119048 A1    Apr. 25, 2019

(30) Foreign Application Priority Data

Oct. 19, 2017 (TW) .............................. 106135954 A

(51) Int. Cl.
| | | |
|---|---|---|
| *B65G 43/08* | (2006.01) | |
| *B65G 1/02* | (2006.01) | |
| *B65G 21/20* | (2006.01) | |
| *B65G 19/28* | (2006.01) | |

(52) U.S. Cl.
CPC .............. *B65G 43/08* (2013.01); *B65G 1/02* (2013.01); *B65G 19/282* (2013.01); *B65G 21/2072* (2013.01)

(58) Field of Classification Search
CPC .......... B65G 43/08; B65G 1/02; B65G 1/026; B65G 1/14; B65G 21/2072; B65G 19/282; B65G 11/14; B65G 11/143
USPC ....................................... 198/836.3, 363, 445
See application file for complete search history.

(56) References Cited

U.S. PATENT DOCUMENTS

| | | | | |
|---|---|---|---|---|
| 4,880,104 A | * | 11/1989 | Evans | ................... B65B 59/005 198/445 |
| 6,209,707 B1 | * | 4/2001 | Ronchi | .............. B65G 21/2072 198/445 |
| 7,207,428 B2 | * | 4/2007 | Huttner | .............. B65G 21/2072 198/444 |
| 8,371,433 B2 | * | 2/2013 | Jendrichowski | ... B65G 21/2072 198/442 |

(Continued)

FOREIGN PATENT DOCUMENTS

JP          2001312770 A   *  11/2001   .............. G07F 11/34

*Primary Examiner* — Mark A Deuble
(74) *Attorney, Agent, or Firm* — Muncy, Geissler, Olds & Lowe, P.C.

(57) ABSTRACT

A conveyer device with stepless adjustment is disclosed. The conveyer device includes a conveyer platform disposed above a base, a clasping rod of an adjusting module is disposed above the conveyer platform, partition plates can hook and engage the side edges of the clasping rod and the conveyer platform, to partition the conveyer platform to form conveying channels, a horizontal sliding unit is disposed under the conveyer platform, and a longitudinal sliding unit and a magnetic driving part are movably assembled on the horizontal sliding unit, and a magnetic sliding part is disposed on the surface of the conveyer platform corresponding to the magnetic driving part, the magnetic sliding part can be driven by magnetic force of the magnetic driving part, to move on the conveyer platform in longitudinal and horizontal directions, so as to align the magnetic sliding part to the conveying channel and move an object.

8 Claims, 10 Drawing Sheets

(56) References Cited

U.S. PATENT DOCUMENTS

| | | | |
|---|---|---|---|
| 8,931,631 B2* | 1/2015 | Vasse | B65G 21/2072 198/836.1 |
| 2016/0122132 A1* | 5/2016 | Bell | B65G 21/2072 198/836.3 |

* cited by examiner

CONVEYER DEVICE WITH STEPLESS ADJUSTMENT

This application claims the priority benefit of Taiwan patent application number 106135954, filed on Oct. 19, 2017.

BACKGROUND OF THE INVENTION

1. Field of the Invention

The present invention relates to a conveyer device with stepless adjustment. More particularly, the present invention relates to a conveyer device which can steplessly adjust widths of conveying channels to facilitate to receive various to-be-conveyed objects, and in the conveyer device, an adjusting module and a driving module are assembled in a base, and the at least one partition plate of the adjusting device can be used to partition the conveyer platform of the base to form at least two conveying channels, and the driving module can align each conveying channel, so as to achieve the purpose of facilitating to convey objects through the conveying channel.

2. Description of the Related Art

Conventionally, many machines used in automated processing and manufacturing, the transmission of processed objects in production lines or quality control, or the transmission of large quantities of goods in warehouse logistics, may require manual feeding operation or the semi-automatic short-distance conveying operation, and it is time-consuming and labor-intensive, and also disadvantageous to the mass production or the transmission of a large number of items. With the continuous advancement of the electronic technology, the conveyor belt and the roller-type conveying system or robot arm are applied in automatic conveying system to transport materials or processed objects, so that working hours can be effectively shortened, and the quality of automated work can be improved. These technologies have been widely used in various processing industries, logistics industries, or production lines that require automatic distribution.

The conveyor belt, the roller conveyor, the robot arm used in the general automatic delivery conveyor system or the transportation of the article inside the vending machine must be driven by a power apparatus such as a motor, a pneumatic cylinder or a hydraulic cylinder; however, the conveying operation may cause high noise, dust or impact, and it may result in lower efficiency in material handling, especially for the precision machining places, electronic high-tech product manufacturing places or dust-free processing places, or the transportation of items inside vending machines; and, in these places, the automatic conveying system is highly required to convey items in a state of low noise, or no dust and no foreign matter. For this reason, the conventional conveying system using the conveyor belt, the roller conveyor or the robot arm is not suitable for the applications of precision machining, production of electronic high-tech products, or dust-free processing, or the transportation inside the vending machines.

Furthermore, the automatic conveying system, such as a vending machine, is usually used to convey a plurality of different items to be sold, and each to-be-sold item is separately conveyed by a conveying channel, and each conveying channel uses different power apparatus, such as a motor, a pneumatic cylinder, or a conveyor belt, for conveying operation; however, the conveying process can be impeded or stopped easily, which affects the smooth operation of the conveyor. Since the vending machine must be equipped with complex convey system for various items to be sold, it is inconvenient in design and also increases the manufacturing cost. Moreover, the sizes and shapes of various items to be sold may be different, so various widths of conveying channels must be provided in the vending machine, and different power apparatuses must be used to the different the items to be sold; therefore, the items to be sold are required to be designed in fixed patterns and predetermined sizes. Once the various conveying channels are set, they cannot be changed or adjusted. If the conveying channels must be changed, all conveying channels must be remanufactured or modified, and re-construction of the conveying channels also lead to increased difficulty in the manufacture of vending machines; furthermore, the conveying channels cannot be reused, and it also causes a lot of waste.

Therefore, what is needed is to develop a conveyer device to solve the problems that the convention conveying system easily causes high noise and instability during application and operation, and have fixed modes, fixed-sized channels, and inconvenience in use.

SUMMARY OF THE INVENTION

In order to solve the above-mentioned problems, the inventor develops, according to collected data and multiple tests and modifications, and years of experience in the industry, the conveyer device which can steplessly adjust and change the widths of the conveying channels on the conveyer platform to adapt different shapes and sizes of the to-be-conveyed objects.

An objective of the present invention is that the conveyer device includes a conveyer platform disposed above an accommodation space of a base, a clasping rod of an adjusting module is disposed above a side of the conveyer platform, two opposite sides of at least one partition plate can hook and engage on the clasping rod and on side edge of the conveyer platform, so as to partition the conveyer platform to form at least two conveying channels, and a horizontal sliding unit of a driving module can be disposed in the accommodation space under the conveyer platform, and a longitudinal sliding unit and a magnetic driving part are movably assembled above the horizontal sliding unit, and a magnetic sliding part is disposed on the surface of the conveyer platform corresponding to the magnetic driving part, so that the magnetic sliding part can be driven by magnetic force of the magnetic driving part, to move on the conveyer platform in longitudinal and horizontal directions, and align to the at least one conveying channel, thereby achieving the purpose of moving and sliding the magnetic sliding part through the at least one conveying channel to move the to-be-conveyed object. As a result, the at least one partition plate on the conveyer platform can be steplessly adjusted, to partition the surface of the conveyer platform to form the at least two conveying channels with variable widths.

An objective of the present invention is that the base comprise a box body having the accommodation space, the conveyer platform is assembled above the accommodation space of the box body, and the box body has a conveyer outlet formed on a side of the conveyer platform, and wall plates disposed on two opposite sides of the conveyer outlet for blocking the two opposite sides of the conveyer platform, respectively, and the box body also has stop bodies disposed the other side of the two wall plates opposite to the conveyer outlet, and sliding slots having rectangular shapes disposed on wall plates adjacent to two opposite sides of the stop bodies, respectively; and, sliding shafts on two ends of the clasping rod of the adjusting module can be inserted into the sliding slots, respectively, and the position-limiting mechanism are disposed on the two opposite sides of the wall plates adjacent to the two sliding slots, respectively, for limiting the slide of the clasping rod, and ends of the elastic members of the position-limiting mechanism are inserted into the two sliding shafts, respectively, and other ends of the two elastic members are fixed on the positioning bodies, respectively, and the two positioning bodies are assemble to the two wall plates, respectively.

Another objective of the present invention is that the at least one partition plate of the adjusting module include a first hook part disposed on a top of a side thereof and bent downwardly to form a hook-shaped structure for hooking and engaging on the clasping rod, and a second hook part formed on a bottom of other side thereof opposite the first hook part and bent downwardly to form a lying U-shaped structure, for horizontally engaging with the side edge of the conveyer platform.

Another objective of the present invention is that the horizontal sliding unit of the driving module includes a base member, two sliding tracks, at least two opposite slidable members, a base board and a first driving apparatus, and the base member is disposed on a bottom of the accommodation space under the conveyer platform of the base, and the base member includes two sliding tracks disposed thereon, and at least two opposite slidable members are movably assembled on each two sliding track, and the base board is fixed on the two slidable members for assembling with the longitudinal sliding unit, and the sliding holder is assembled on a side of the base board, and the first driving apparatus is disposed on the sliding holder, and the toothed track of the first driving apparatus is disposed on a side of the base member, so that the first motor can drive the gear to roll and move on the toothed track.

Another objective of the present invention is that the longitudinal sliding unit of the driving module is assembled on the base board of the horizontal sliding unit, and the longitudinal sliding unit comprises at least two opposite hanging-arm rail devices, at least two opposite sliders and a second driving apparatus, and the at least two opposite hanging-arm rail devices are fixed on the base board, and the at least two opposite sliders are movably assembled on the two hanging-arm rail devices, and the second driving apparatus is disposed on the two hanging-arm rail devices and inner sides of at least two sliders; and, the second driving apparatus comprises a second motor, a transmission part driven by the second motor, a sliding component driven by the transmission part, a magnetic driving part assembled on the sliding component and at least two opposite sliders, a magnetic sliding part disposed on the surface of the conveyer platform of the base and slidable in longitudinal and horizontal directions and corresponding to the magnetic driving part; and, the holder of the magnetic driving part is disposed on the sliding component and at least two opposite sliders, and the holder includes at least one first accommodation hole to accommodate at least one first magnetic body, and the magnetic sliding part includes a moving holder aligned to the holder, and the moving holder includes at least one second accommodation hole disposed thereon for fixing the at least one second magnetic body; and, the at least one second magnetic body can be driven by the magnetic force of the at least one first magnetic body, to move in longitudinal and horizontal directions, thereby achieving the purpose of stepless sliding movement; and, the at least one first magnetic body assembled on the holder can be an annular magnetic body, and the at least one second magnetic body assembled on the moving holder can be circular magnetic body, and the circular magnetic body is aligned over an inner ring hole of the annular magnetic body.

DETAILED DESCRIPTION OF THE PREFERRED EMBODIMENTS

Figure 1:
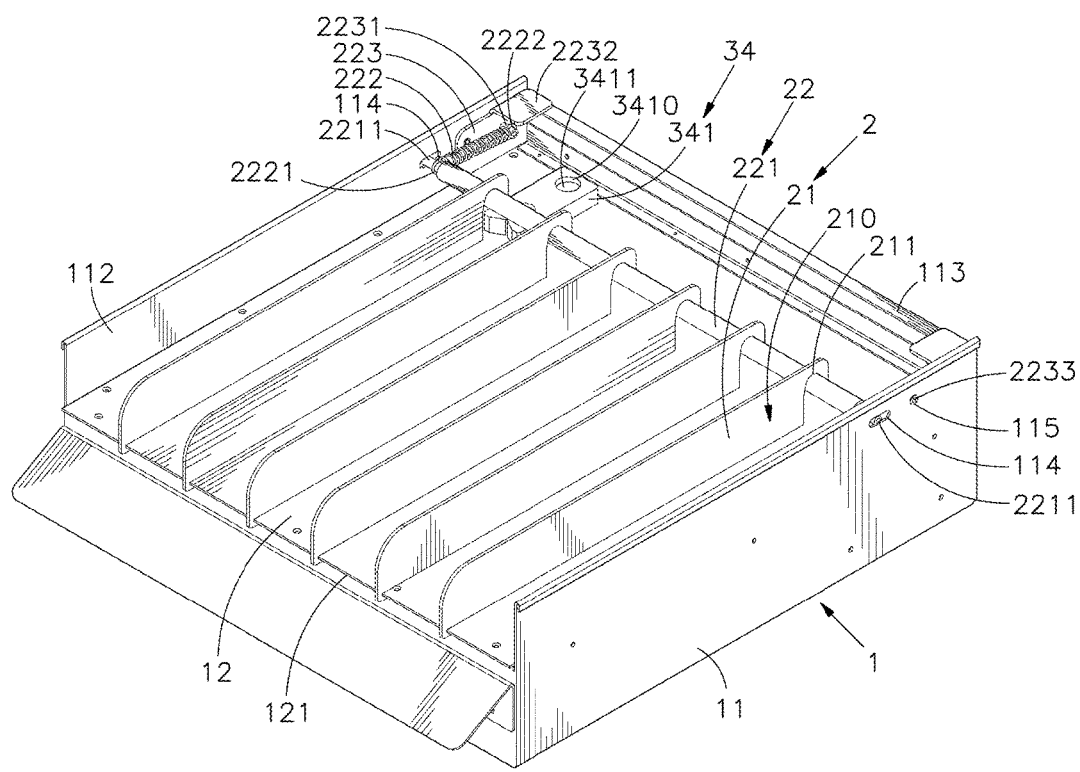
FIG. 1 is an elevational view of a conveyer device of the present invention.
Figure 2:
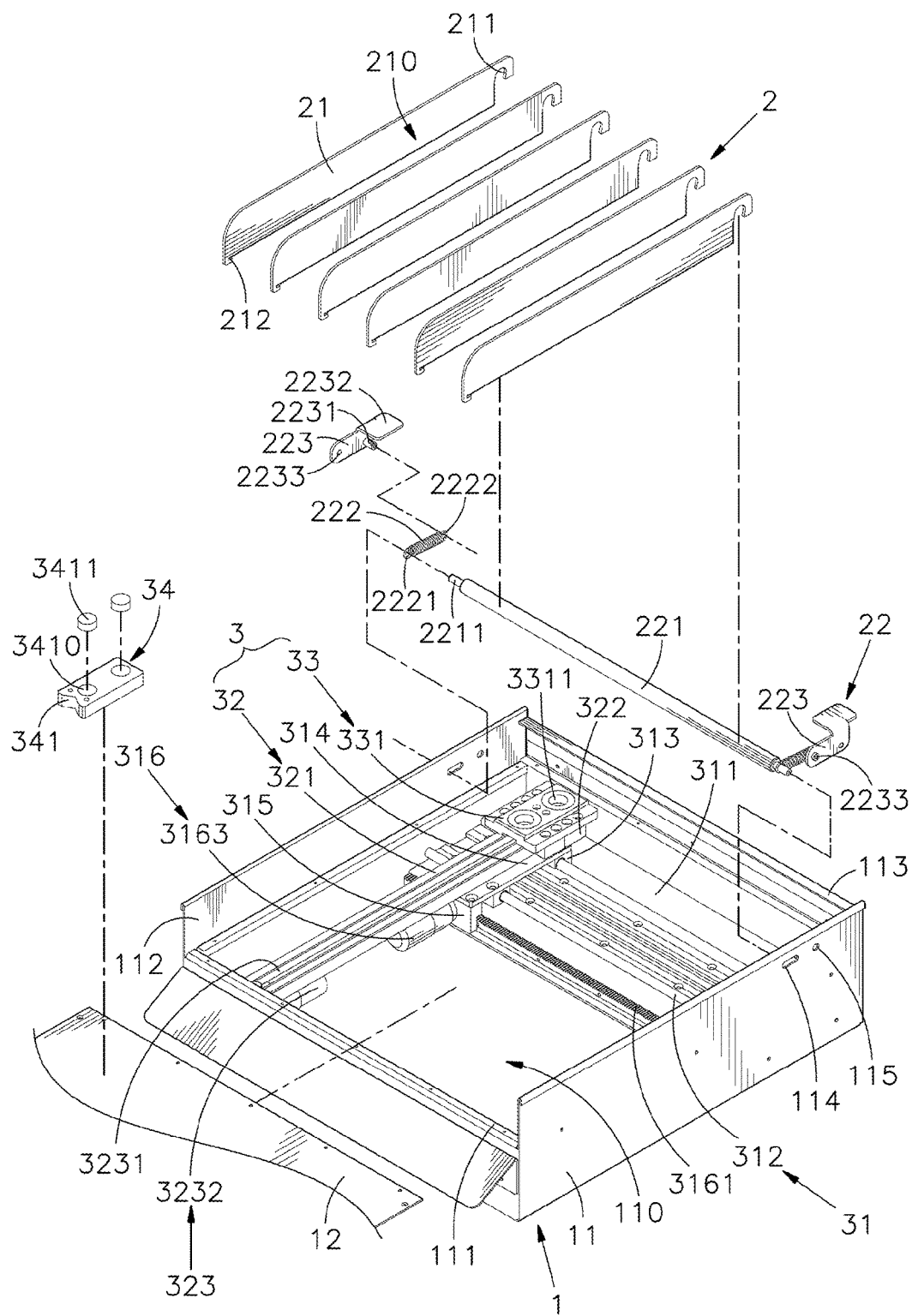
FIG. 2 is an exploded view of a conveyer device of the present invention.
Figure 3:
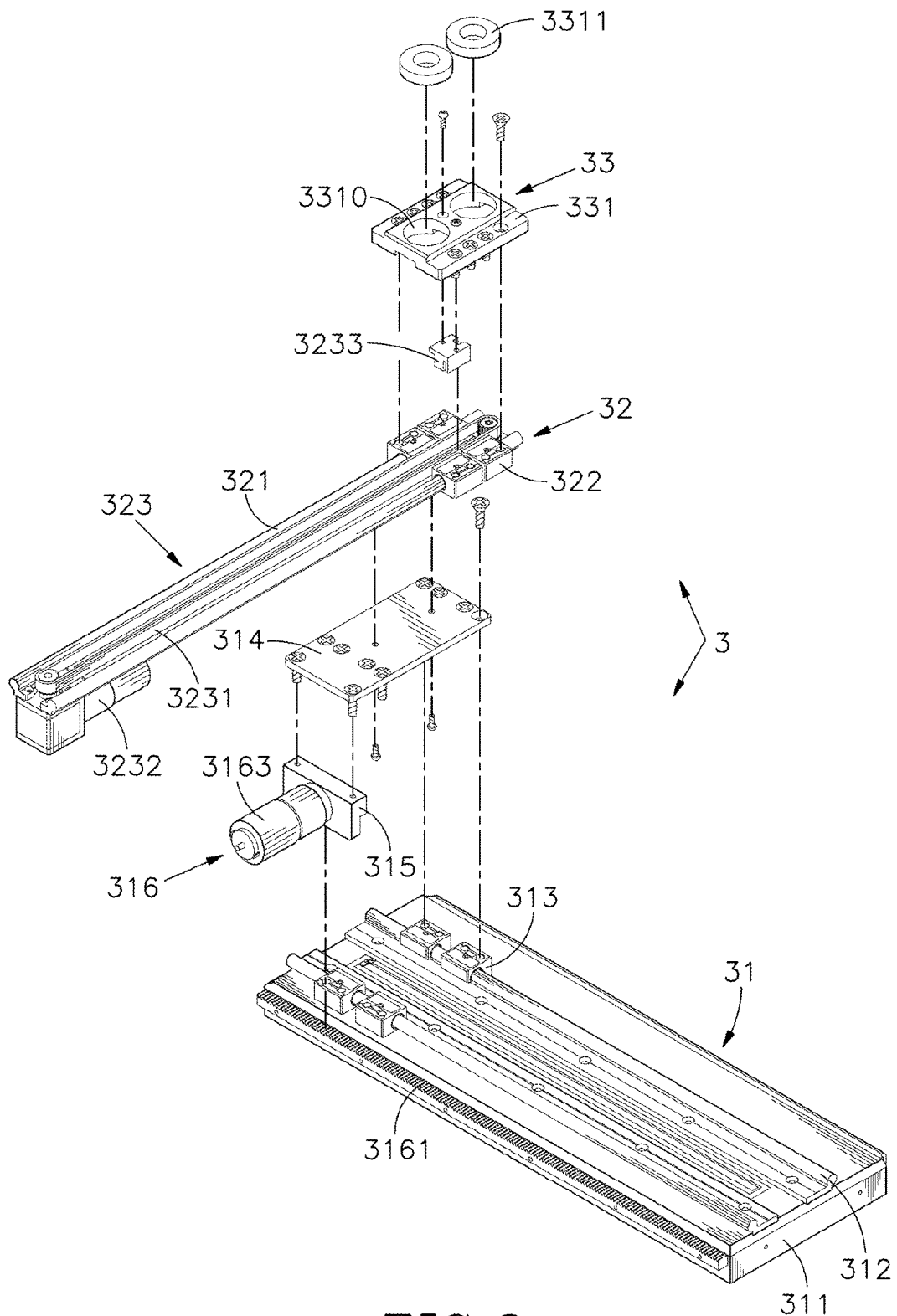
FIG. 3 is an exploded view of a driving module of a conveyer device of the present invention.
Figure 4:
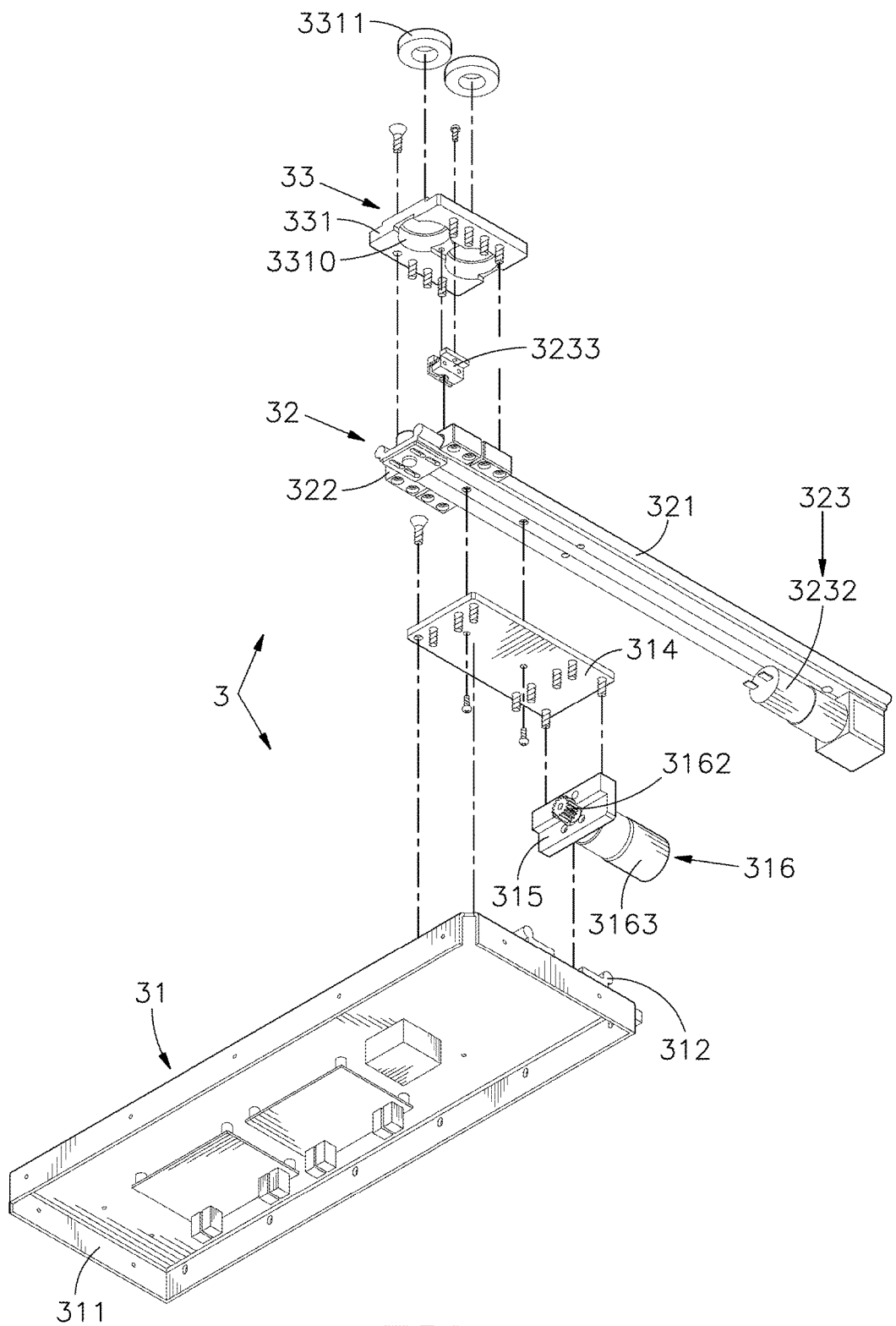
FIG. 4 is an exploded view of a driving module of a conveyer device of the present invention, when viewed from another angle.
Figure 5:
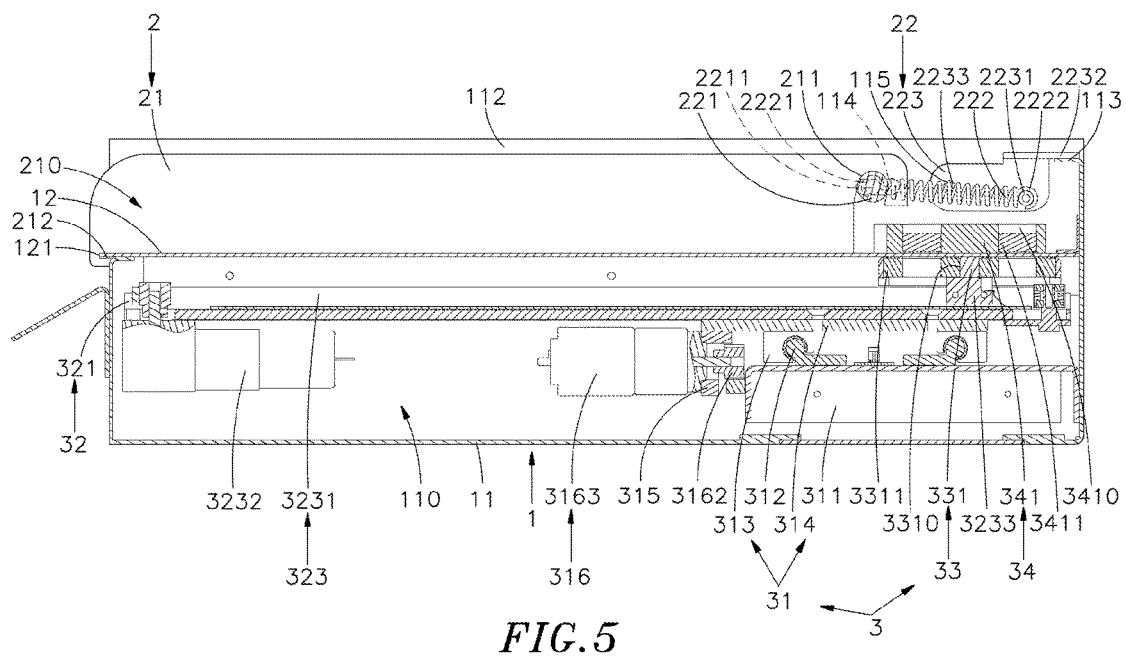
FIG. 5 is a sectional side view of a conveyer device of the present invention.
Figure 6:
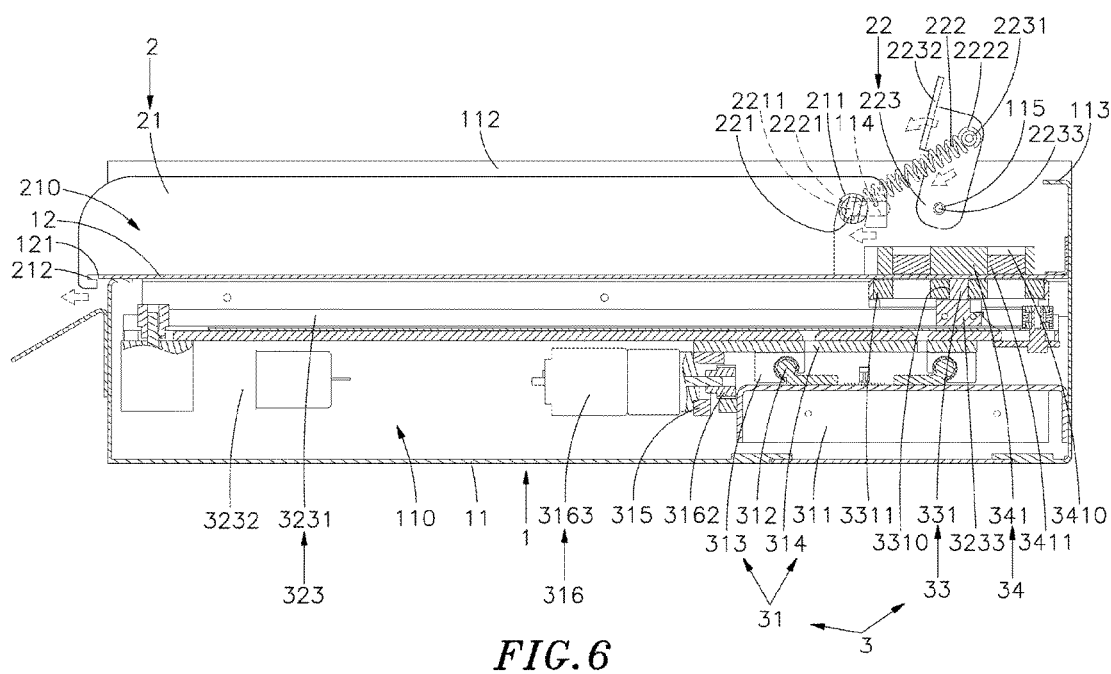
FIG. 6 is a sectional side view of operation of an adjusting module of a conveyer device of the present invention.
Figure 7:
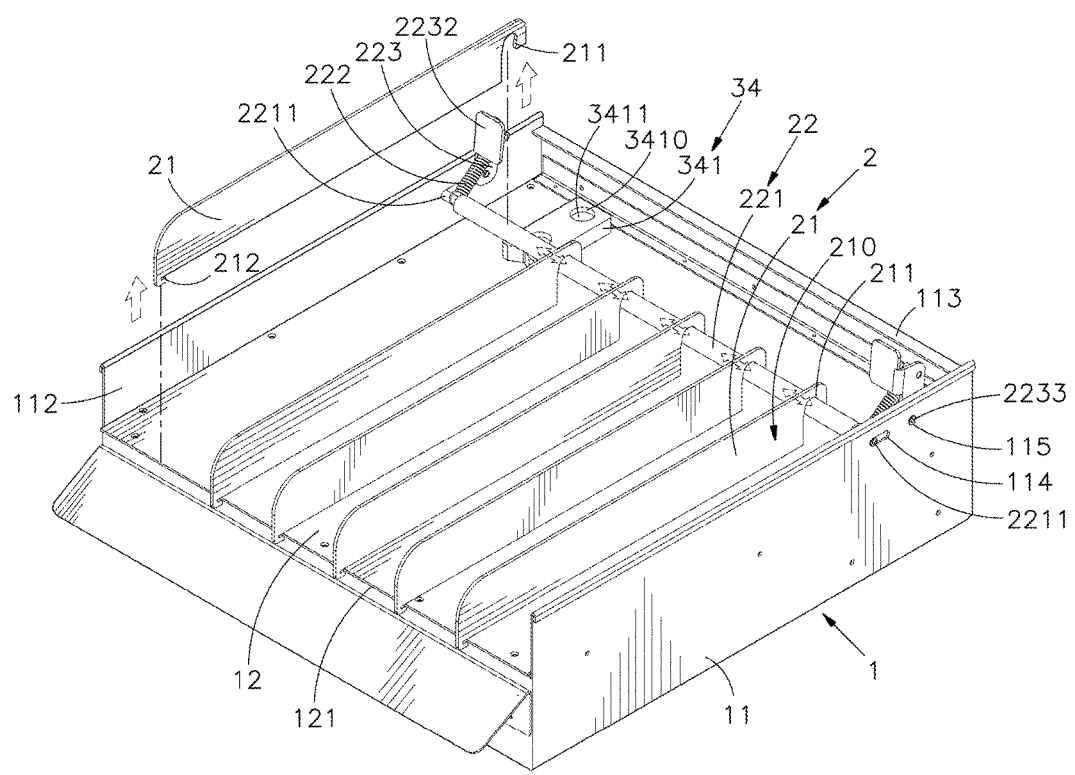
FIG. 7 is an elevational view of operation of an adjusting module of a conveyer device of the present invention.

Please refer to FIGS. 1 to 5, which show an elevational view, an exploded view of a conveyer device of the present invention, an exploded view of a driving module of the present invention, an exploded view of a driving module of a conveyer device of the present invention when viewed from another angle, and a sectional side view of a conveyer device of the present invention, respectively. As shown in FIGS. 1 to 5, the conveyer device includes a base 1, an adjusting module 2, and a driving module 3.

The base 1 includes a box body 11 and a conveyer platform 12. The box body 11 includes an accommodation space 110 formed inside thereof, and the conveyer platform 12 is assembled above the accommodation space 110, and the accommodation space 110 includes a conveyer outlet 111 formed on a side of the box body 11 at an outer side edge 121 of the conveyer platform 12 and in communication with the outsides. Two wall plates 112 are disposed on two opposite sides of the box body 11 adjacent to the conveyer outlet 111, and configured to block two opposite sides of the conveyer platform 12. The box body 11 includes stop bodies 113 disposed on other sides of the two wall plates 112 away from the conveyer outlet 111, and sliding slots 114 having rectangular shapes formed on two wall plates 112 adjacent to the stop body 113 respectively, and pivoting parts 115.

The adjusting module 2 includes at least one partition plate 21 and a position-limiting mechanism 22. The at least one partition plate 21 comprises a first hook part 211 and a second hook part 212 disposed on two opposite sides thereof, respectively. The first hook part 211 can hook and engage on a clasping rod 221 of the position-limiting mechanism 22, and the clasping rod 221 includes sliding shafts 2211 protruded on two opposite ends thereof and having reduced diameter, respectively, and the sliding shafts 2211 are inserted through first shaft parts 2221 at ends of elastic members 222, respectively, and second shaft parts 2222 on other ends of the two elastic members 222 are fixed on shafts 2231 of two positioning bodies 223, respectively. Each of the two positioning bodies 223 includes a wing plate 2232 extended from a top side in a vertical direction, and a shaft part 2233 is formed on other side of each of the two positioning bodies 223 opposite to the wing plate 2232.

The driving module 3 includes a horizontal sliding unit 31, a longitudinal sliding unit 32, a magnetic driving part 33 and a magnetic sliding part 34. The horizontal sliding unit 31 comprises a base member 311, two opposite sliding tracks 312 disposed on the base member 311, at least two opposite slidable member 313 movably assembled on the two sliding tracks 312, a base board 314 assembled on the two slidable members 313, a sliding holder 315 assembled with a side of the base board 314, and a first driving apparatus 316 assembled on the sliding holder 315. The first driving apparatus 316 comprises a toothed track 3161 disposed on a side of the base member 311, a gear 3162 disposed on the toothed track 3161 and configured to roll on the toothed track 3161, and a first motor 3163 linked to the gear 3162. The gear 3162 and the first motor 3163 are disposed on the sliding holder 315, and the two hanging-arm rail devices 321 of the longitudinal sliding unit 32 are assembled on the base board 314 on a top of the sliding holder 315, and at least two opposite sliders 322 are movably assembled on the two hanging-arm rail devices 321, respectively, and a transmission part 3231 of a second driving apparatus 323 is assembled on the two hanging-arm rail devices 321 and on inner sides of the two sliders 322. In an embodiment, the transmission part 3231 can be a belt, a belt pulley set or a chain, a sprocket set, a rack, or a rack gear set, and the transmission part 3231 is driven by a second motor 3232. A sliding component 3233 is assembled on the transmission part 3231 relative to the inner side of the at least two sliders 322, and a holder 331 of the magnetic driving part 33 is assembled on the at least two sliders 322 and the sliding component 3233. The holder 331 includes at least one first accommodation hole 3310 formed thereon, and at least one first magnetic body 3311 is assembled in the at least one first accommodation hole 3310. A moving holder 341 of the magnetic sliding part 34 is disposed over the holder 331 of the magnetic driving part 33, and the moving holder 341 includes at least one second accommodation hole 3410 disposed thereon, and at least one second magnetic body 3411 can be assembled in the at least one second accommodation hole 3410.

In order to assemble aforementioned components, the adjusting module 2 is assembled above the conveyer platform 12 on the box body 11 of the base 1, the shaft parts 2233 of the two positioning bodies 223 of the position-limiting mechanism 22 of the adjusting module 2 can be pivotally connected to the pivoting parts 115 of the two wall plates 112, respectively; for example, the manner of movably pivotally connecting the shaft parts 2233 to the pivoting parts 115 can be a riveting manner, a manner of pivotally connecting the shafts to the shaft holes, or a screwing manner. The two positioning bodies 223 are rotatable in the two pivoting part 115. Furthermore, the two positioning bodies 223 are inserted into the sliding shafts 2211 at two opposite ends of the clasping rod 221 through the two elastic members 222, and the sliding shafts 2211 at two opposite ends of the clasping rod 221 are inserted into the sliding slots 114 of the two wall plates 112, respectively; and, the clasping rod 221 is hooked and engaged with the at least one partition plate 21, and the second hook part 212 at other side of the at least one partition plate 21 can be clasped with the outer side edge 121 of the conveyer platform 12 by a horizontally sliding engagement manner. As a result, the at least one partition plate 21 and the two wall plates 112 of the box body 11 can partition the surface of the conveyer platform 12 to form at least two conveying channels 210. The driving module 3 is assembled in the accommodation space 110 of the box body 11, the base member 311 of the horizontal sliding unit 31 of the driving module 3 can be fixed on the bottom of the accommodation space 110, and the first driving apparatus 316 can drive the longitudinal sliding unit 32 and the magnetic driving part 33 on the bottom of the conveyer platform 12; and, the at least one first magnetic body 3311 can be used to drive the at least one second magnetic body 3411 of the magnetic sliding part 34 by magnetic force, so as to drive the moving holder 341 of the magnetic sliding part 34 to horizontally move and slide on the surface of the conveyer platform 12, and the second driving apparatus 323 can drive the magnetic driving part 33 to control the magnetic sliding part 34 simultaneously to align to any of the conveying channel 210 on the surface of the conveyer platform 12 and longitudinally slide and move along the at least one partition plate 21. As a result, the conveying mode of the conveyer device can be the steplessly switched in horizontal and longitudinal directions, so that the magnetic sliding part 34 can smoothly slide and move on the surface of the conveyer platform 12 without being impeded or stopped easily. According to the above, the base 1, the adjusting module 2 and the driving module 3 can form the conveyer device with stepless adjustment of the present invention.

The at least one partition plate 21 of the adjusting module 2 can include the first hook part 211 disposed on the top of the side thereof and bent downwardly to form a hook shape, and the second hook part 212 formed on the bottom of the other side thereof extended and bent in horizontal direction and having a lying U-shaped structure. The second hook part 212 is parallel with the bottom of the partition plate 21.

In an embodiment, the at least one first magnetic body 3311 of the magnetic driving part 33 can be an annular magnetic body, and the at least one second magnetic body 3411 of the magnetic sliding part 34 can be a circular magnetic body, and the magnetic driving part 33 and the magnetic sliding part 34 are aligned to each other and disposed on the two surface of the conveyer platform 12 of the base 1, respectively. For example, the circular magnetic body of the at least one second magnetic body 3411 of the magnetic sliding part 34 can be aligned above an inner ring hole of the annular magnetic body of the at least one first magnetic body 3311, so that the at least one first magnetic body 3311 of the magnetic driving part 33 can drive, by magnetic force, the at least one second magnetic body 3411, and the at least one second magnetic body 3411 can also simultaneously drive the moving holder 341 of the magnetic sliding part 34 to slide and move on the surface of the conveyer platform 12. It should be noted that the power sources and circuit layouts for the first driving apparatus 316 and the first motor 3163 of the horizontal sliding unit 31, and the second driving apparatus 323 and the second motor 3232 of the longitudinal sliding unit 32 are not key points of the present invention, so they are not shown in the figures.

Please refer to FIGS. 2, 5 to 7 and 10, which show an exploded view, a sectional side view of a conveyer device of the present invention, a sectional side view of operation of the adjusting module, an elevational view of operation of the adjusting module, an elevational view of a preferred embodiment of a conveyer device of the present invention. As shown in figures, in the conveyer device with stepless adjustment of the present invention, the adjusting module 2 is assembled above the conveyer platform 12 of the base 1, and the at least one partition plate 21 of the adjusting module 2 uses the first hook part 211 to hook and engage with the clasping rod 221, and use the second hook part 212 to clasp the outer side edge 121 of the conveyer platform 12, so that the at least one partition plate 21 in cooperation with the two wall plates 112 of the box body 11 can partition the surface of the conveyer platform 12 to form the at least two conveying channels 210, and the width of the each conveying channel 210 can be adjusted upon conveying requirement. For example, a user can upwardly pull the wing plates 2232 on sides of the two positioning bodies 223 of the position-limiting mechanism 22 movably and pivotally connected to the two wall plates 112, to rotate the positioning body 223 about the shaft parts 2233 and the pivoting parts 115; and, at the same time, the sliding shafts 2211 on two opposite ends of the clasping rod 221 mounted on ends of the two elastic member 222 are also driven to horizontally slide along the sliding slots 114 on the two wall plates 112, and at least one partition plate 21 can be pushed toward the conveyer outlet 111 of the box body 11, and the second hook part 212 of the at least one partition plate 21 can be dropped out of the outer side edge 121 of the conveyer platform 12, thereby steplessly adjusting the at least one partition plate 21 to slide along the surface of the conveyer platform 12, and changing the widths and interval of the at least two conveying channels 210. After the adjustment is completed, the force applied on the wing plate 2232 of the positioning body 223 of the two position-limiting mechanism 22 can be released, and the two positioning bodies 223 are rotated in the pivoting part 115 of the two wall plates 112 to return to its former position, and the two elastic members 222 simultaneously drive the sliding shafts 2211 on two opposite ends of the clasping rod 221 to slide in the two sliding slots 114, so as to drive the at least one partition plate 21 to slide on the surface of the conveyer platform 12; and, at the same time, the second hook part 212 of the at least one partition plate 21 is horizontally slid to engage with the outer side edge 121 of the conveyer platform 12, and the first hook part 211 on the side of the at least one partition plate 21 can be hooked and engaged with the clasping rod 221 of the position-limiting mechanism 22, and the second hook part 212 on the other side of the at least one partition plate 21 can be clasped with the outer side edge 121 of the conveyer platform 12, thereby achieving the purpose of stably limiting the at least one partition plate 21 on the surface of the conveyer platform 12; furthermore, the at least one partition plate 21 can form at least two conveying channels 210 on the surface of the conveyer platform 12, and the widths and the interval of the conveying channels 210 can be to movably and steplessly adjusted to adapt various to-be-conveyed objects 4 having different shapes, volumes, sizes, so that various to-be-conveyed objects 4 can be placed in the conveying channel 210 easily. The conveyer device can have wide applicability, for example, the conveyer device can convey the to-be-conveyed objects 4 without being limited and can be repeatedly applied in different fields. In an embodiment, the to-be-conveyed object 4 can be a workpiece to be processed, a processed component, or a mechanism component, or an article for sale in the vending machine.

Figure 8:
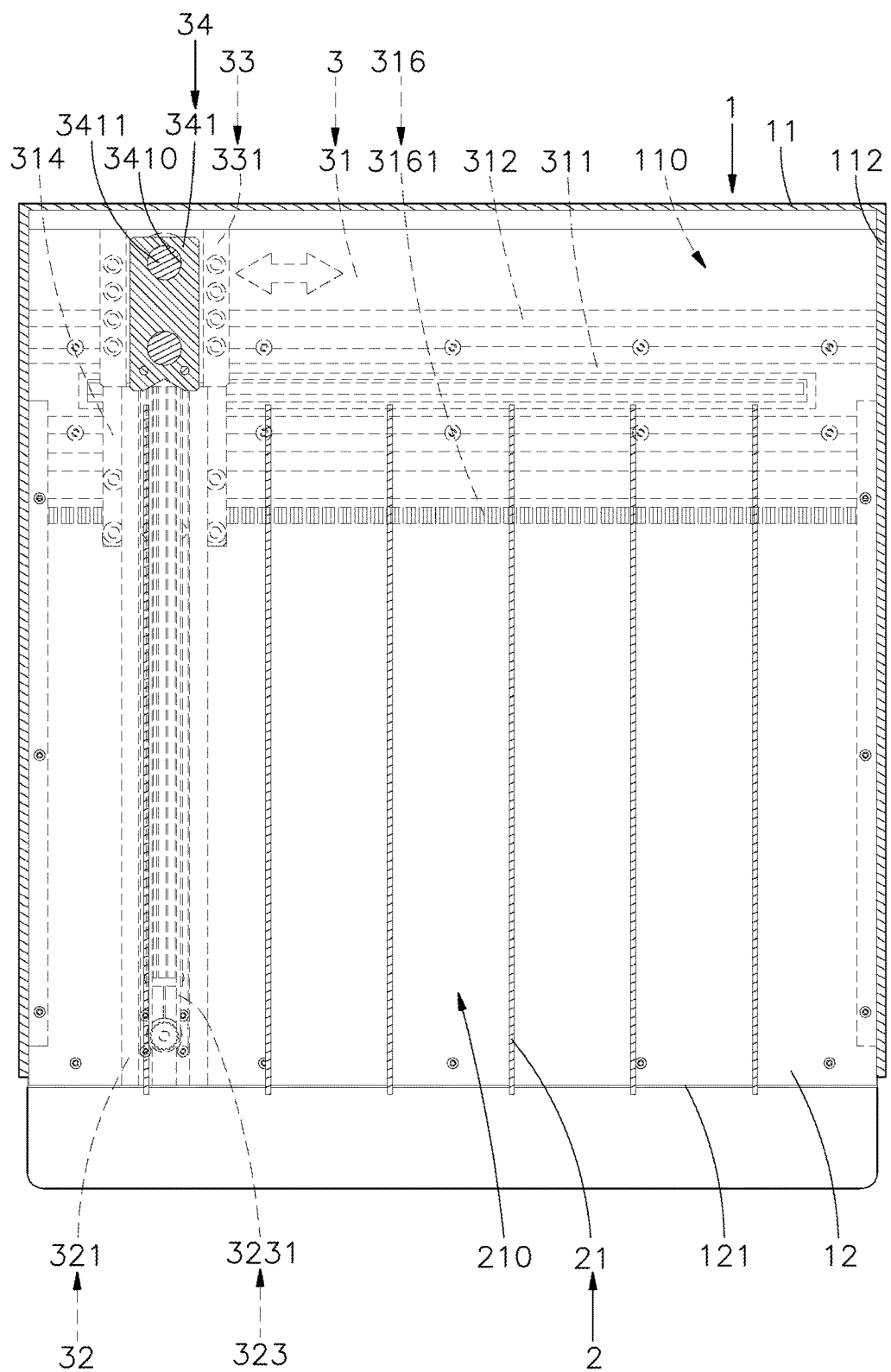
FIG. 8 is a top sectional view of operation of horizontally moving a magnetic sliding part of a conveyer device of the present invention.

Please refer to FIGS. 2, 3 to 5, and 8 to 10, which show an exploded view, an exploded view of a driving module of the present invention, an exploded view of a driving module of a conveyer device of the present invention when viewed from another angle, a sectional side view of a conveyer device of the present invention, a top sectional view of operation of horizontally moving the magnetic sliding part, a top sectional view of operation of longitudinally moving the magnetic sliding part, and an elevational view of a preferred embodiment of a conveyer device of the present invention, respectively. As shown in figures, in the conveyer device with stepless adjustment of the present invention, the driving module 3 assembled in the accommodation space 110 of the box body 11 of the base 1 can use the first motor 3163 through the first driving apparatus 316 of the horizontal sliding unit 31, to drive the gear 3162 to reciprocate and roll on the toothed track 3161, and drive the sliding holder 315 and the base board 314 to move simultaneously, and the base board 314 can drive the at least two slidable members 313 to reciprocate and slide on the two opposite sliding tracks 312, and the longitudinal sliding unit 32 assembled on the base board 314 can use the at least one first magnetic body 3311 of the magnetic driving part 33 to drive, by magnetic force, the second magnetic body 3411 of the magnetic sliding part 34 disposed on the surface of the conveyer platform 12, so that the magnetic sliding part 34 can be synchronously displaced with the magnetic driving part 33, and the magnetic driving part 33 on the longitudinal sliding unit 32 can be driven simultaneously by the base board 314, to further drive the moving holder 341 of the magnetic sliding part 34 to slidably reciprocate on the surface of the conveyer platform 12 in horizontal direction, as shown in FIG. 8, and the moving holder 341 of the magnetic sliding part 34 can be aligned to any the conveying channel 210 partitioned by the two wall plates 112 and at least one partition plate 21.

Figure 9:
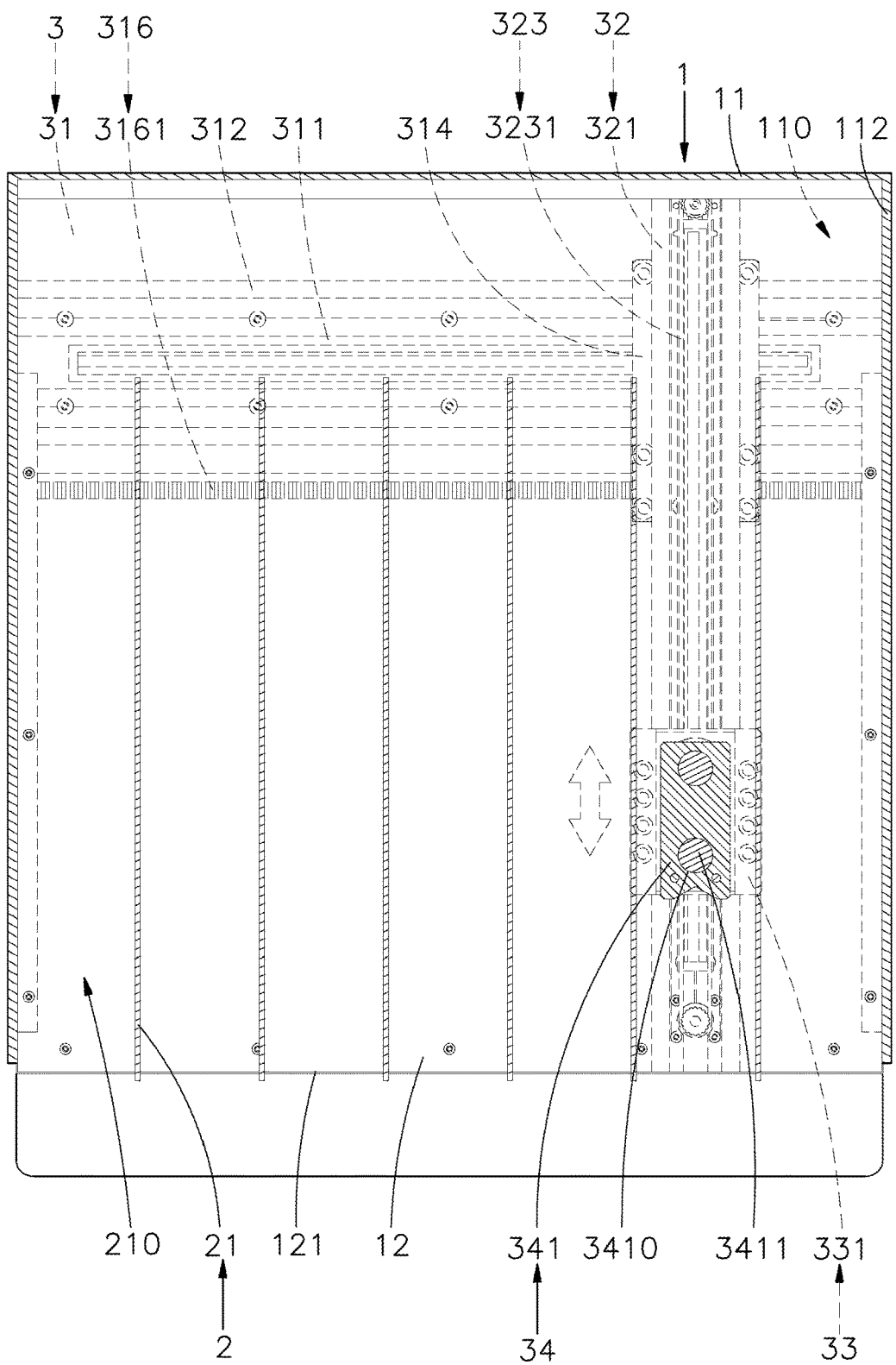
FIG. 9 is a top sectional view of operation of longitudinally moving a magnetic sliding part of a conveyer device of the present invention.
Figure 10:
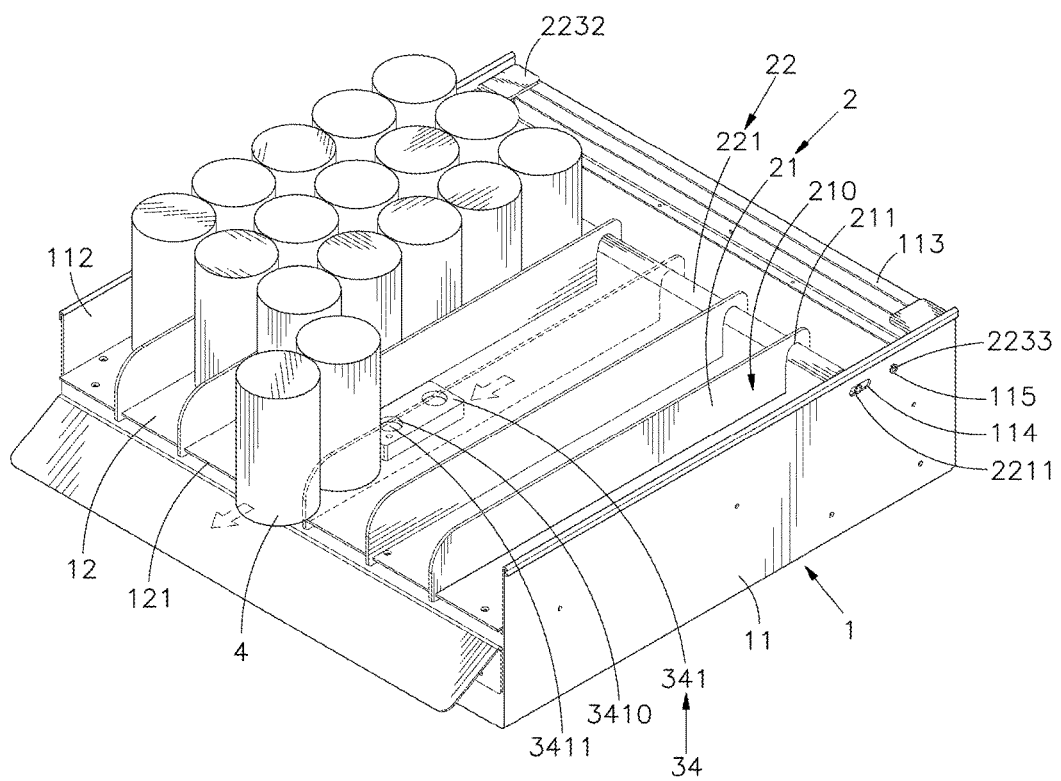
FIG. 10 is an elevational view of a preferred embodiment of a conveyer device of the present invention.

When the moving holder 341 of the magnetic sliding part 34 aligns to any the conveying channel 210, the second driving apparatus 323 of the longitudinal sliding unit 32 can use the second motor 3232 to drive the transmission part 3231, to further drive the sliding component 3233 and the at least two slider 322 to slidably reciprocate along the two hanging-arm rail devices 321; and, at the same time, the sliding component 3233 and the holder 331 on the at least two slider 322 can use the at least one first magnetic body 3311 to drive, by magnetic force, the second magnetic body 3411 of the magnetic sliding part 34 disposed on the surface of the conveyer platform 12, to simultaneously move the moving holder 341 of the magnetic sliding part 34 to slidably reciprocate in any the conveying channel 210 in a longitudinal direction and in parallel with any the partition plate 21, as shown in FIG. 9. The horizontal sliding unit 31 and the longitudinal sliding unit 32 drive the magnetic driving part 33, the at least one first magnetic body 3311 drives the second magnetic body 3411 by a magnetic force, so that the moving holder 341 of the magnetic sliding part 34 disposed on the surface of the conveyer platform 12 can steplessly switch reciprocation in horizontal or longitudinal direction, and the moving holder 341 can slide smoothly without being impeded or stopped easily.

After at least one to-be-conveyed object 4 is placed in the at least two conveying channels 210 partitioned by the at least one partition plate 21 and the two wall plates 112 on the surface of the conveyer platform 12 of the base 1, the horizontal sliding unit 31 and the longitudinal sliding unit 32 of the driving module 3 can use the magnetic driving part 33 to drive, by magnetic force of the at least one first magnetic body 3311 of the magnetic driving part 33, the at least one second magnetic body 3411 of the magnetic sliding part 34 disposed on the surface of the conveyer platform 12, and the at least one second magnetic body 3411 also simultaneously drive the moving holder 341 to align to any the conveying channel 210, so that the to-be-conveyed object 4 in the conveying channel 210 can be moved to the conveyer outlet 111 on the side of the box body 11, thereby achieving the effect of smoothly conveying the to-be-conveyed object 4.

Furthermore, the conveyer device of the present invention can be applied to automatic manufacturing and production machine, transmission of processed object for production line or quality control, transmission of large amount of goods for warehouse logistics, or automatic vending machine. The to-be-conveyed object 4 can be a workpiece to be processed, processed component, a mechanism component, or an article for sale in the vending machine. When the to-be-conveyed object 4 has different shape, volume or size, the at least one partition plate 21 on the conveyer platform 12 of the base 1 can cooperates with the position-limiting mechanism 22 to perform stepless adjustment to match the volume and the size of the to-be-conveyed object 4, and after the adjustment, the magnetic sliding part 34 of the driving module 3 can convey the to-be-conveyed object 4. As a result, the conveyer device of the present invention can steplessly adjust the channel to convey different to-be-conveyed object 4 with different volume or shape, and the conveyer device can have unlimited and wide range of applications, better practicability, and unanticipated effect.

The above is merely a preferred embodiment of the present invention for exemplary illustration, and the present invention is not limited thereto. In the conveyer device of the present invention, the conveyer platform 12 is assembled above the accommodation space 110 inside the box body 11 of the base 1, and the at least one partition plate 21 and the position-limiting mechanism 22 of the adjusting module 2 are assembled on the conveyer platform 12, the at least one partition plate 21 cooperating with the two wall plates 112 of the box body 11 can partition the surface of the conveyer platform 12 to form the at least two conveying channels 210, and the driving module 3 is assembled in the accommodation space 110 of the box body 11 under the conveyer platform 12; and, the horizontal sliding unit 31 and the longitudinal sliding unit 32 can drive the at least one first magnetic body 3311 of the magnetic driving part 33 to drive, by magnetic force of the at least one first magnetic body 3311, the at least one second magnetic body 3411 of the magnetic sliding part 34, and the at least one second magnetic body 3411 also simultaneously drive the moving holder 341 to slidably reciprocate on the surface of the conveyer platform 12 in horizontal and longitudinal directions steplessly, so as to achieve the purpose of steplessly adjusting the at least one partition plate 21 of the adjusting module 2 in cooperation with the position-limiting mechanism 22 on the surface of the conveyer platform, to adjust the width or interval of the at least two conveying channels 210 partitioned by the at least one partition plate 21 and the two wall plates 112. As a result, different to-be-conveyed object 4 with different volumes or shapes can be placed on the conveying channels 210 and moved by the moving holder 341 of the magnetic sliding part 34. It should be noted that various equivalent structural changes, alternations or modifications based on the descriptions and figures of present disclosure are all consequently viewed as being embraced by the spirit and the scope of the present disclosure set forth in the claims.

The main concept of the present invention is that the conveyer platform is assembled above the accommodation space of the box body of the base, the at least one partition plate and the position-limiting mechanism of the adjusting module are assembled on the conveyer platform, and the driving module is assembled in the accommodation space of the box body under the conveyer platform, and the at least one partition plate of the adjusting module in cooperation with the position-limiting mechanism to perform stepless adjustment on the conveyer platform; and, the at least one the partition plate in cooperation with the two wall plates of the box body can partition the surface of the conveyer platform to form the at least two conveying channels, and the widths or the interval of the conveying channels on the conveyer platform can be steplessly adjusted, so that the to-be-conveyed object with different volume or shape can be placed in the conveying channel, and the horizontal sliding unit and the longitudinal sliding unit of the driving module can drive the magnetic driving part to use the at least one first magnetic body, to drive the at least one second magnetic body of the magnetic sliding part by magnetic force, and the moving holder of the magnetic sliding part disposed on the surface of the conveyer platform can slidably reciprocate in longitudinal and horizontal directions, and the reciprocation can be switched steplessly, and the moving holder can slide and move the to-be-conveyed object. It should be noted that the above is merely a preferred embodiment of the present invention for exemplary illustration, and the present invention is not limited thereto.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A conveyer device with stepless adjustment, comprising:
    a base comprising an accommodation space formed inside thereof, a conveyer platform disposed above the accommodation space, and a conveyer outlet formed on an outer side edge thereof facing the conveyer platform, and wall plates disposed on two opposite sides thereof adjacent to the conveyer outlet, respectively;
    an adjusting module comprising a clasping rod disposed on a side of the base above the conveyer platform, and at least one partition plate configured to partition, in cooperation with the two wall plates, the conveyer platform to form at least two conveying channels, hook parts disposed on two opposite sides of the at least one partition plate respectively and configured to hook and engage with the clasping rod and the outer side edge of the conveyer platform, wherein the at least one partition plate is horizontally slidable, through the hook parts, on the conveyer platform for steplessly adjusting widths of the at least two conveying channels; and
    a driving module disposed in the accommodation space under the conveyer platform of the base, and comprising a horizontal sliding unit, a longitudinal sliding unit movably assembled on the horizontal sliding unit, a magnetic driving part assembled on the longitudinal sliding unit, and a magnetic sliding part driven by a magnetic force of the magnetic driving part to align to the at least one conveying channels on the conveyer platform for sliding operation.

2. The conveyer device according to claim 1, wherein the base comprises a box body having the accommodation space, the conveyer platform assembled above the accommodation space of the box body, and the box body comprises the conveyer outlet formed on the outer side edge thereof facing the conveyer platform, and the two wall plates disposed on two opposite sides of the conveyer outlet and configured to block the two opposite sides of the conveyer platform respectively, and stop bodies disposed on other sides of the two wall plates opposite to the conveyer outlet, and the wall plates comprise sliding slots formed near to the stop bodies respectively and configured for insertion of two ends of the clasping rod of the adjusting module, and a position-limiting mechanism disposed on the two sides of the two wall plates adjacent to the two sliding slots respectively and configured to limit the slide of the clasping rod.

3. The conveyer device according to claim 2, wherein the base comprises the sliding slots having rectangular shapes and formed on the two wall plates thereof adjacent to the stop bodies, respectively, and the clasping rod of the adjusting module comprises sliding shafts formed at two opposite ends thereof and movably engaged with the two sliding slots, respectively, and each of the two position-limiting mechanism comprises an elastic member, and the elastic members comprise ends inserted through the sliding shafts, respectively, and other ends fixed on positioning bodies assembled on the two wall plates, respectively.

4. The conveyer device according to claim 1, wherein the at least one partition plate of the adjusting module comprises a first hook part formed on a top of a side thereof and configured to hook and engage on the clasping rod, and a second hook part formed on a bottom of other side thereof and configured to engage a side edge of the conveyer platform.

5. The conveyer device according to claim 1, wherein the horizontal sliding unit of the driving module comprises a base member disposed on a bottom of the accommodation space under the conveyer platform of the base, two sliding tracks disposed on the base member, at least two opposite slidable members slidably assembled on the two sliding tracks, a base board fixed on the two slidable members and configured to assemble with the longitudinal sliding unit, a sliding holder assembled with a side of the base board, and a first driving apparatus disposed on the sliding holder, and the first driving apparatus comprises a toothed track disposed on a side of the base member, a gear assembled with the toothed track, and a first motor configured to drive the gear to roll and move on the toothed track.

6. The conveyer device according to claim 5, wherein the longitudinal sliding unit comprises at least two opposite hanging-arm rail devices fixed on the base board, at least two opposite sliders movably assembled on the two hanging-arm rail devices respectively, a second driving apparatus disposed on the two hanging-arm rail devices and on inner sides of the at least two sliders, and the second driving apparatus comprises a second motor, a transmission part driven by the second motor, a sliding component driven by the transmission part, a magnetic driving part assembled on the sliding component and the at least two opposite sliders, and a magnetic sliding part slidably disposed on a surface of the conveyer platform of the base corresponding to the magnetic driving part.

7. The conveyer device according to claim 6, wherein the magnetic driving part comprises a holder disposed on the sliding component and the at least two opposite sliders, at least one first magnetic body disposed on the holder, and the magnetic sliding part comprises a moving holder aligned to the holder, and the moving holder comprises at least one second magnetic body driven by magnetic force of the at least one first magnetic body.

8. The conveyer device according to claim 7, wherein the holder comprises at least one first accommodation hole configured to fix the at least one first magnetic body, and the moving holder comprises at least one second accommodation hole configured to fix the at least one second magnetic body, and the at least one first magnetic body is an annular magnetic body, the at least one second magnetic body is a circular magnetic body aligned over an inner ring hole of the annular magnetic body.

* * * * *